March 12, 1963 G. R. ROSENDAHL 3,080,791
PROJECTORS

Filed Jan. 12, 1959 8 Sheets-Sheet 1

INVENTOR.
GOTTFRIED R. ROSENDAHL
BY
Horace B. Van Valkenburgh
ATTORNEY

March 12, 1963 G. R. ROSENDAHL 3,080,791
PROJECTORS
Filed Jan. 12, 1959 8 Sheets-Sheet 2
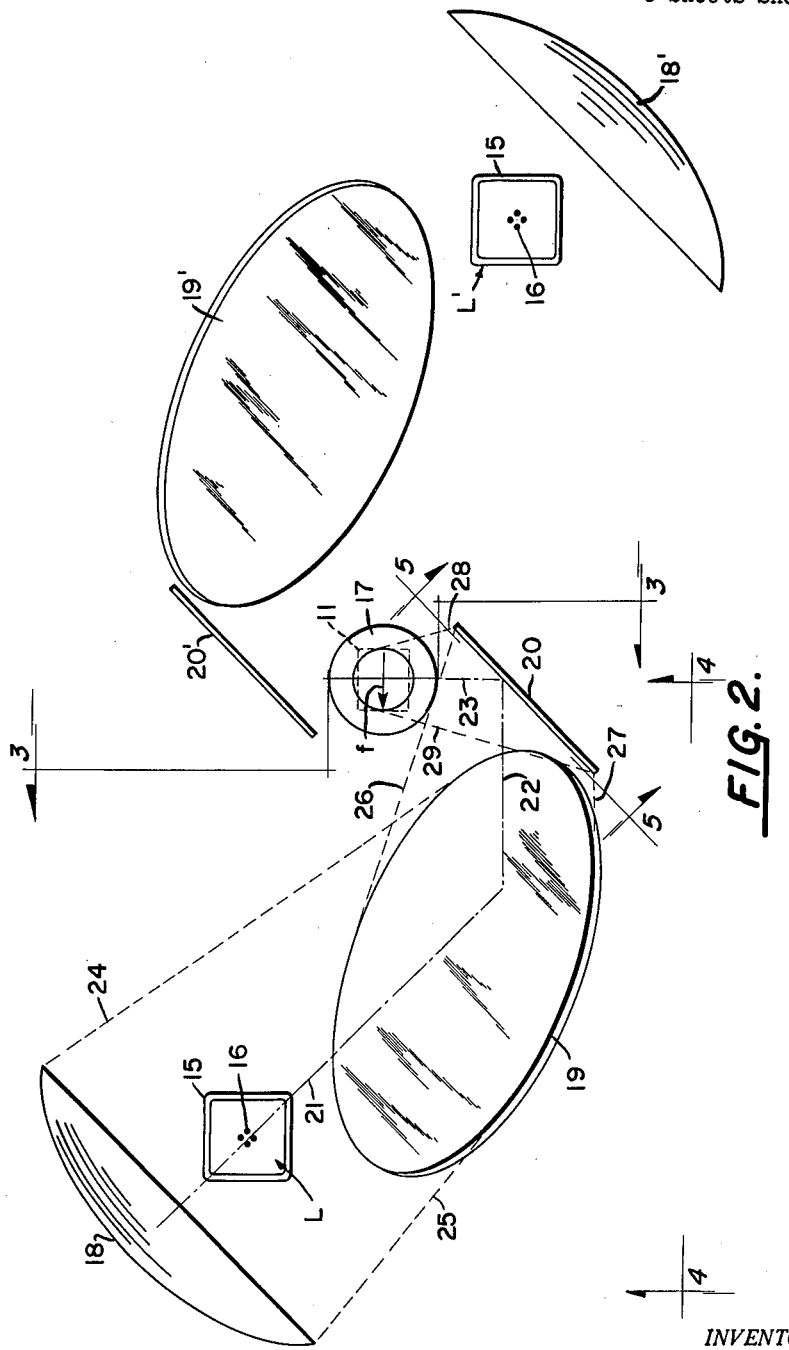
INVENTOR.
GOTTFRIED R. ROSENDAHL
BY
Horace B. Van Valkenburgh
ATTORNEY March 12, 1963 G. R. ROSENDAHL 3,080,791
PROJECTORS Filed Jan. 12, 1959 8 Sheets-Sheet 3

INVENTOR.
GOTTFRIED R. ROSENDAHL
BY
Horace B. Van Valkenburgh
ATTORNEY

March 12, 1963     G. R. ROSENDAHL     3,080,791
PROJECTORS

Filed Jan. 12, 1959                                          8 Sheets—Sheet 4

INVENTOR.
GOTTFRIED R. ROSENDAHL
BY
*Horace B. Van Valkenburgh*
ATTORNEY

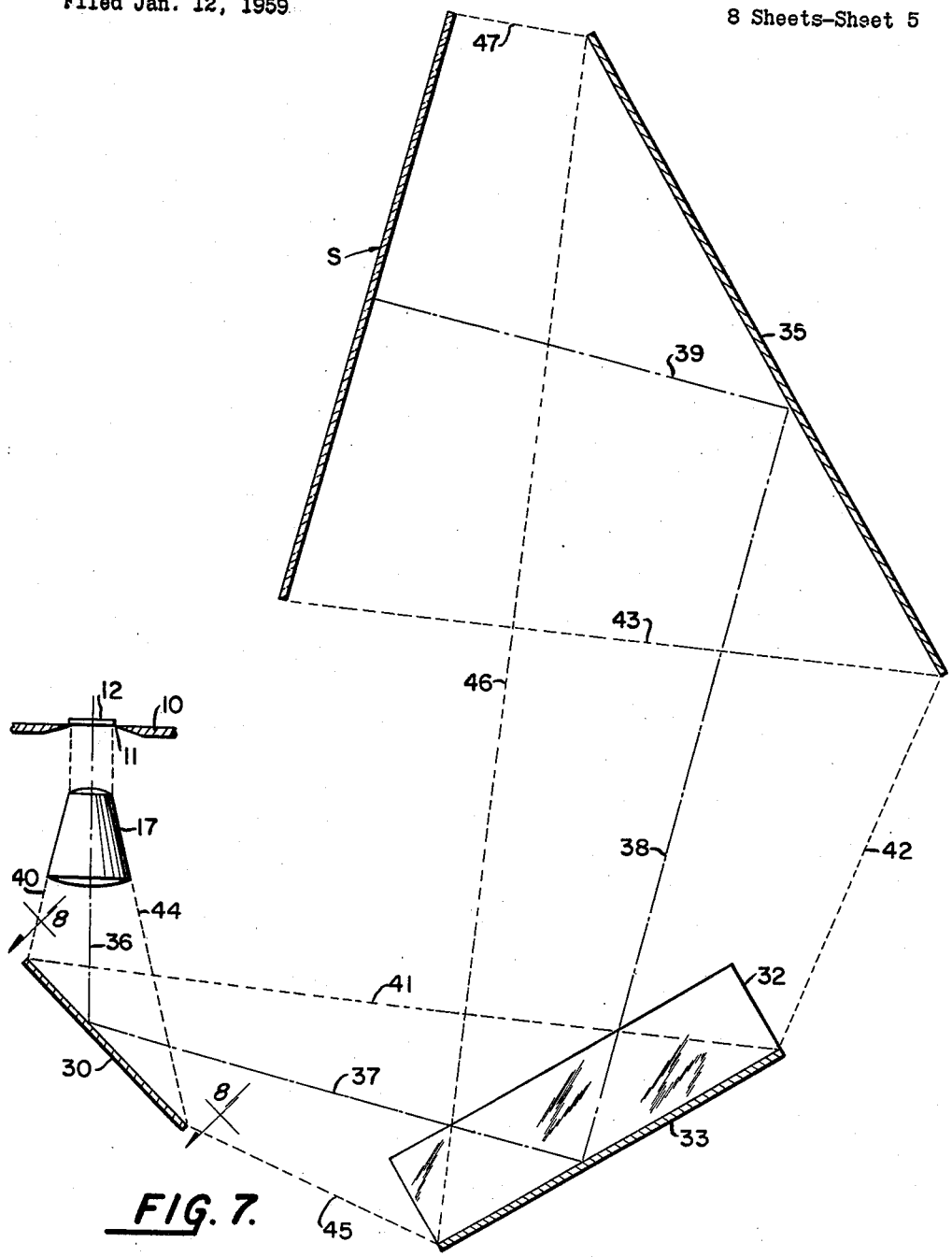

March 12, 1963 G. R. ROSENDAHL 3,080,791
PROJECTORS

Filed Jan. 12, 1959 8 Sheets-Sheet 6

INVENTOR.
GOTTFRIED R. ROSENDAHL
BY
Horace B. Van Valkenburgh
ATTORNEY

March 12, 1963 G. R. ROSENDAHL 3,080,791
PROJECTORS

Filed Jan. 12, 1959 8 Sheets-Sheet 7

INVENTOR.
GOTTFRIED R. ROSENDAHL
BY
Horace B. Van Valkenburgh
ATTORNEY

March 12, 1963    G. R. ROSENDAHL    3,080,791
PROJECTORS

Filed Jan. 12, 1959    8 Sheets—Sheet 8

INVENTOR.
GOTTFRIED R. ROSENDAHL
BY
Horace B. Van Valkenburgh
ATTORNEY

UNITED STATES PATENT OFFICE

3,080,791
PATENTED MAR. 12, 1963

3,080,791
PROJECTORS
Gottfried R. Rosendahl, Boulder, Colo., assignor to Ball Brothers Research Corporation, Boulder, Colo., a corporation of Colorado
Filed Jan. 12, 1959, Ser. No. 786,337
12 Claims. (Cl. 88—24)

This invention relates to projectors, such as microreaders or projectors for the magnified projection of an opaque microrecord, which may be the reduced reproduction of a printed page, drawing, or a similar item.

In previous types of projectors used for the above purpose, the microrecord to be reproduced on an enlarged scale is placed on a window or opening in a housing and is illuminated by one or more lamps. Both the window opening and the screen are usually in a horizontal surface of the housing, while the illuminated image of the microrecord is enlarged by a lens system, usually placed directly beneath the window and reflected by a mirror onto a screen which occupies another and larger opening in the housing. Since the lens occupies a position directly beneath the window, illumination produced at the window for the microrecord must be at an acute angle and within the space between the lens and the window. For this purpose, one previous such projector, which is considered to have a relatively high efficiency, uses six low voltage, incandescent lamps grouped in a half circle around the window and each having a single filament disposed in horizontal position or inclined at an acute angle to a vertical position. To increase the illumination, a spherical back mirror is placed on the opposite side of the lamp from the window, this spherical back mirror having a focal length such that an image of the filament is produced in the plane of the filament and adjacent thereto, so that illumination from both the filament and the back mirror can be picked up by a lens condenser placed between the lamp and the window. This lens condenser produces an image of the filament image appearing from the back mirror, at a point intermediate the lens condenser and the window, the light then diverging from this focal plane to the window. Additional illumination can be secured by a "slave unit" which consists of a second spherical mirror placed at one side of the lamp and also producing an image of the filament adjacent the filament and in the plane thereof, but at a point relative to the filament perpendicular to the image produced by the first or back mirror. The light from the second mirror or side spherical mirror, together with light emanating from the filament at the opposite side of the lamp, is reflected by a plane mirror through a second lens condenser placed to one side of the first lens condenser, the second lens condenser producing an image of the filament and the filament image from the side mirror at a point between the second lens condenser and the window, the light then again diverging from the focal plane and to the window. The necessity for focusing each of the lens condensers at a point ahead of the mirror results in unavoidable light losses, while, due to heating, the filaments tend to sag into a vertical position, with a resultant change in the position of the filament and the possibility of short circuits. Because of space requirements, only five of the lamps can be provided with a "slave unit", so that the illumination system thus consists of six lamps, eleven spherical mirrors, five plane mirrors and twenty-two condenser lenses.

Among the objects of the present invention are to provide a novel microreader or projector for the magnified projection of an opaque microrecord or the like; to provide such a projector in which the ratio of the light output on the screen is relatively high, compared with the electrical input to the lamps, thereby reducing power consumption and the heat dissipated; to provide a novel illumination system for such a projector; to provide such an illumination system in which the number of lamps necessary may be reduced to reduce the problems involved in supply of current to the lamps and maintenance; to provide a novel projection system for such a projector; to provide such a projection system which is particularly compatible with the illumination system of this invention; and to provide such a projector, illumination system and projector system which are readily made and efficient and effective in operation.

The above and additional objects of this invention, as well as the novel features thereof, will become apparent from the following description, taken in connection with the accompanying drawings, in which:

FIG. 2 is a top plan view of certain lamps and mirrors which may form an illumination system of this invention and may be installed within the housing of FIG. 1;

FIG. 7 is a condensed, partly diagrammatic vertical section, taken generally along line 7—7 of FIG. 1, illustrating a projection system of this invention and also illustrating the projection of the image of an illuminated microrecord onto a screen;

Figure 1:
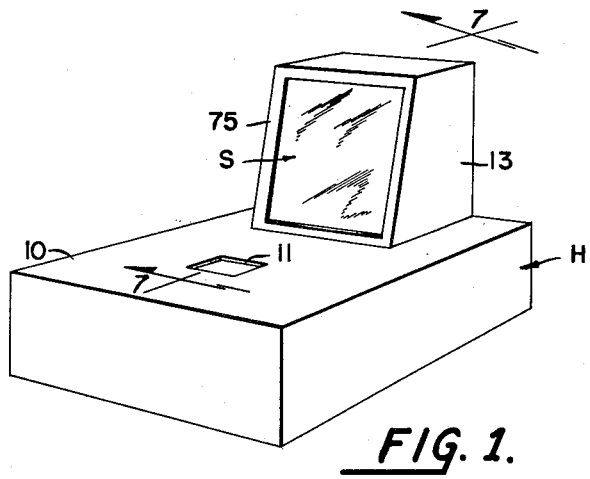
FIG. 1 is a perspective view, on a reduced scale, of a housing for a microreader or projector in which may be incorporated the present invention.

A microreader or projector constructed in accordance with this invention may include the elements hereinafter described, conveniently installed within a housing H of FIG. 1, in the top 10 of which is provided a window 11 on which a microrecord 12 may be placed, as in FIG. 3, for illumination and projection of the microrecord image on a screen S, which is conveniently mounted in an upstanding auxiliary portion 13 of the housing, so that it is disposed at an acute angle to the vertical and thus may be easily seen by an observer at the front of the housing who causes the desired microrecords to be placed over the window 11. It will be understood, of course, that a multiple microrecord may be used, such as a strip of film or card having thereon the reproduction of a considerable number of pages of a telephone directory, book, or the like, so that the card, for instance, may thus have a length and breadth equal to a multiple of the length and breadth of the window 11. In addition, a suitable conventional device may be used for moving the film strip step by step or in increments across the window 11 and such a device may be mounted on the housing 10. Since such devices are conventional, the same have not been illustrated.

Figure 3:
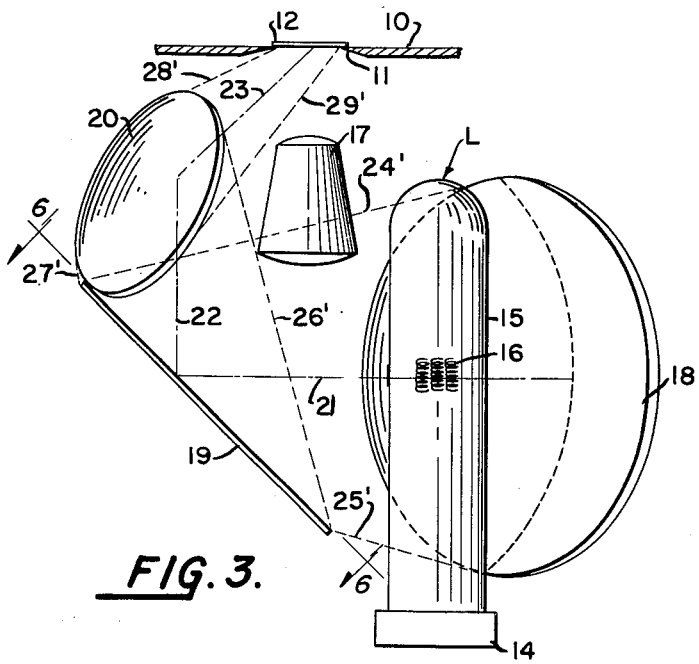
FIG. 3 is an offset vertical section, taken along line 3—3 of FIG. 2.

In accordance with this invention, an illumination system is installed within housing H, such as shown in the top plan view of FIG. 2, and may include a pair of vertical lamps L and L', each of which is provided, as in FIG. 3, with a base 14, a square envelope 15, as of glass, within which is a series of four vertical filaments 16 which are aligned with the envelope and disposed in a square relationship at 45° to the side of the envelope 15. The envelope 15 could, of course, have a shape other than square, such as cylindrical, although a square envelope produces less light loss due to reflection than a cylindrical envelope. Suitable conventional supports for base 14 of each lamp L and L' may be provided within housing H, so that envelopes 15 and particularly filaments 16 will be disposed in as exact a vertical position as is obtainable, to minimize the possibility of the filaments sagging and thereby moving out of vertical position while heated. In FIG. 2, the position of window 11 is indicated by dotted lines, since window 11 will actually be above the parts shown in FIG. 2, while window 11 is shown in each of FIGS. 3 and 4 in a fragmentary portion of top 10 of the housing. The location of a projection lens 17, directly beneath window 11, is shown in each of FIGS. 2, 3 and 4, to illustrate the manner in which the light for illuminating the microrecord is directed thereagainst. Of course, the projection lens 17 does not form a part of the illumination system, but does produce the problem involved, i.e., that of illuminating the window and microrecord satisfactorily without undue loss of light, since all the light for illumination of the window must be projected toward the window within the space between lens 17 and the window, as will be evident from FIG. 3.

Figure 4:
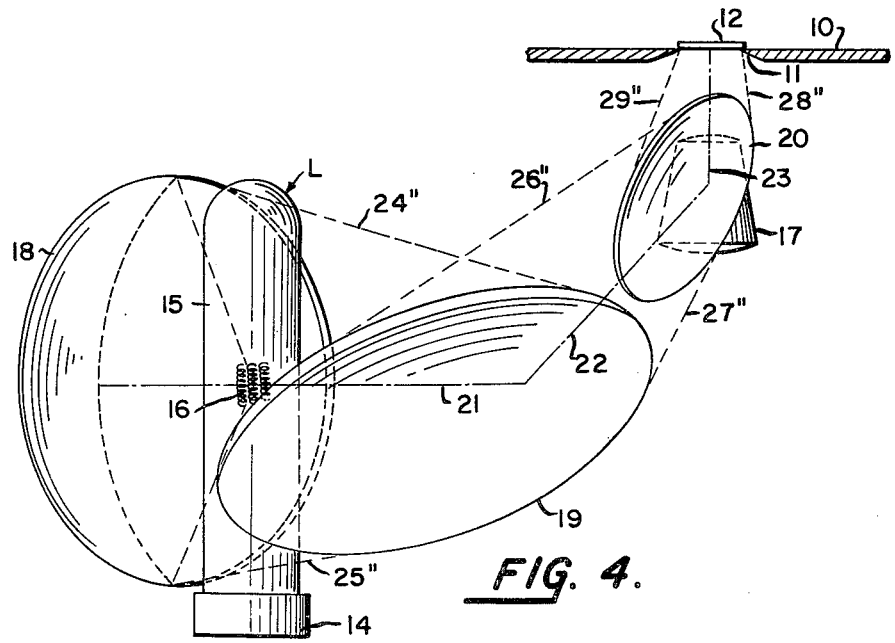
FIG. 4 is a fragmentary vertical section, taken along line 4—4 of FIG. 2.
Figure 5:
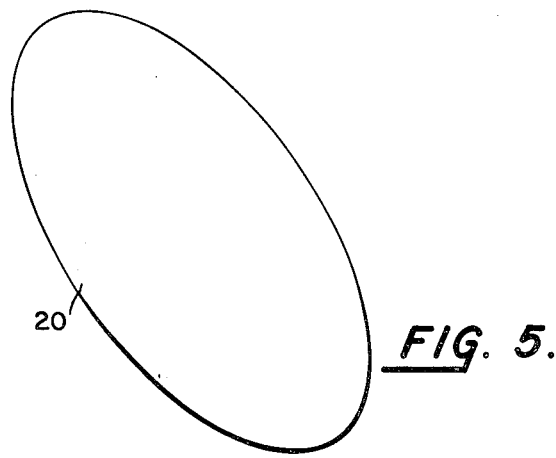
FIG. 5 is a front elevation taken from the position of line 5—5 of FIG. 2, showing the true shape of a plane mirror having an elliptical shape and shown also in FIGS. 2, 3 and 4.
Figure 6:
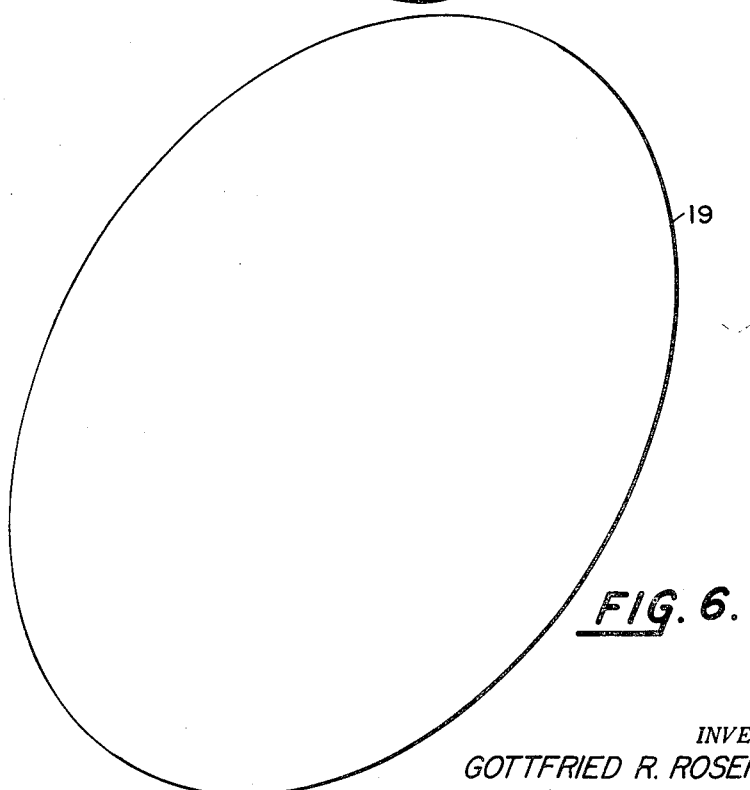
FIG. 6 is a plan view, taken from the oblique position of line 6—6 of FIG. 3, showing the true shape of a plane mirror having an elliptical shape and shown also in FIGS. 2, 3 and 4.

Disposed generally rearwardly of lamp L, with respect to window 11, but angularly with respect to a vertical plane passing through the centers of the lamp and window, is an elliptically concave, focusing mirror 18, which is preferably centered with respect to the square formed by filaments 16 and in alignment with the two opposite corners of the square envelope. Mirror 18 also may be incorporated in envelope 15. The light rays reflected by concave mirror 18 are directed onto a plane mirror 19 whose preferred true shape is shown in FIG. 6 and is preferably elliptical for clearance purposes, mirror 19 being disposed on the opposite side of lamp L from mirror 18 and inclined upwardly, as shown in FIG. 3, so as to direct the light envelope produced on mirror 19 by mirror 18 onto a preferably vertical plane mirror 20, whose preferred true shape is shown in FIG. 5 and is preferably elliptical for clearance purposes. The mirror 20 is disposed at one side of window 11 and at an appropriate position and angle with respect to mirror 19 and window 11, so that the light projected onto the plane mirror 19 will be projected onto the mirror 20 and will then be reflected into window 11. The angular relationship between mirrors 19 and 20 and the concave mirror 18 and window 11, as well as the position of mirrors 19 and 20 with respect to the latter, is chosen such that the image of filaments 16 will be focused in the plane of window 11 and will be transferred from the vertical, as in lamp L, to the horizontal, as in the case of the arrow $f$ of FIG. 2, which represents the image of the filaments 16. Preferably, the height of filaments 16 is chosen, in relation to the projection of the image thereof within window 11, so that the length of the filament image $f$ is equal to one horizontal dimension of window 11. As will be evident, lamp L, elliptical mirror 18 and plane mirrors 19 and 20 should be so arranged that the filament image $f$ in the window 11 will be perpendicular to the optical axis, in the instance shown determined by the dot dash lines 21, 22 and 23. The boundaries of the light envelope focused by mirror 18 onto the plane mirror 19 are indicated by dotted lines 24 and 25 of FIG. 2, the dotted lines 24' and 25' of FIG. 3 and the dotted lines 24" and 25" of FIG. 4. Similarly, the boundaries of the light envelope reflected from mirror 19 onto mirror 20 are indicated by dotted lines 26 and 27 of FIG. 2, the dotted lines 26' and 27' of FIG. 3, and the dotted lines 26" and 27" of FIG. 4, while the boundaries of the light envelope reflected from mirror 20 into the window 11 are indicated by dotted lines 28 and 29 of FIG. 2, the dotted lines 28' and 29' of FIG. 3 and dotted lines 28" and 29" of FIG. 4. As will be evident from FIG. 3, the light reflected from mirror 20 into the window will clear the projection lens 17. As will also be evident from FIGS. 2, 3 and 4 and also FIGS. 5 and 6, which are placed on the sheet as though mirror 20 were moved angularly into the plane of mirror 19 about the line of intersection of the planes of the mirrors, mirrors 19 and 20 need not be elliptical around the entire periphery thereof, but the edge of mirror 19 adjacent mirror 20 and also the lower edge of mirror 20 are curved, such as elliptical, so that mirror 19 and mirror 20 will clear each other and an elliptical shape of each is thus more convenient. Also, with the filament image focused in window 11, the illumination in the direction of the image will be generally uniform. For the transverse direction, the illumination is generally uniform and particularly is adequate, since the light body at the area of interception by the window is much greater in length than width, thus accommodating the acute angle of interception. Also, these factors permit the use of slender and therefore more efficient filaments.

The lamp L', as in FIG. 2, is associated with a preferably elliptically concave mirror 18' and plane mirrors 19' and 20', which are located in similar but complementary or diametrically opposite positions with respect to lamp L' and window 11, as are concave elliptical mirror 18 and plane mirrors 19 and 20 with respect to lamp L. Illumination from lamp L' will be directed into window 11, clearing the projection lens 17, on the opposite side, in the same manner as shown in FIG. 3 for lamp L. It will be noted from FIG. 2 that lamp L is generally at one side and lamp L' generally at the opposite side of window 11 and projection lens 17, thus leaving a clear space beneath lens 17 and also ahead of and behind lens 17 in the lower portion of the housing, as will be evident from FIGS. 3 and 4.

As one example of an illumination system of this invention which, of course, is given for purposes of illustration and not in limitation, the filament size of lamps L and L' is 3.75 mm. by 3.75 mm. by 5 mm. for a window 11 of 25.9 mm. by 27.7 mm. The shorter axis of the ellipse is 204.7 mm. and the longer axis of the ellipse is 289 mm. for the concave elliptical mirrors 18 and 18', which have a diameter of 200 mm. and a magnification of 5.8×, the distance between lamp L or L' and mirror 18 or 18' being 85 mm. The distance along optical axis 21 from mirror 18 to mirror 19 is 270 mm., the distance along optical axis 22 from mirror 19 to mirror 20 is 150 mm., and the distance along optical axis 23 from mirror 20 to window 11 is 90 mm. The plane of each of mirrors 19 and 19' is disposed at an angle of 45° to the horizontal, while vertical mirror 20 is disposed at an angle of 45° to the vertical plane of the axis of window 11 within which lies arrow $f$. The projection lens 17 is a Zeiss Sonnar F/2.0 lens having a focal length of 85 mm. As will be evident, the foregoing illumination system requires only two lamps, two concave mirrors and four plane mirrors, as compared with six lamps, eleven spherical mirrors, five plane mirrors and twenty-two condenser lenses of the prior system described previously. Also, it can be calculated, for a 200 hour lamp lifetime, that the illumination system of this invention produces 1000 lumens at the window for a total input of 500 watts to the two lamps thereof, while the prior system produces 800 lumens at the window for a total input of 450 watts to the six lamps thereof. Thus, the illumination system of this invention, on the basis of such calculations, is about 12½% more efficient than the prior system, in addition to being less costly because of a lesser number of parts and less costly components.

Figure 8:
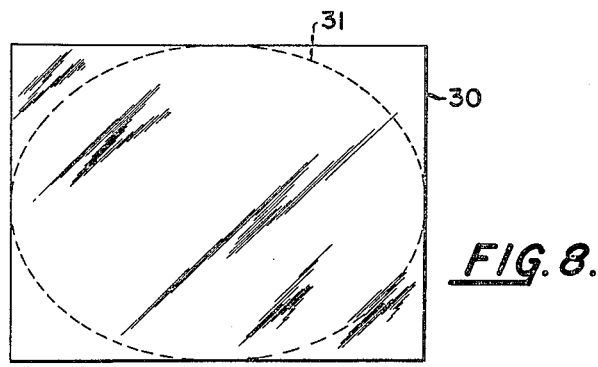
FIG. 8 is a plan view of a mirror which is disposed in an oblique position in FIG. 7 and taken from the position of line 8—8 of FIG. 7.
Figure 9:
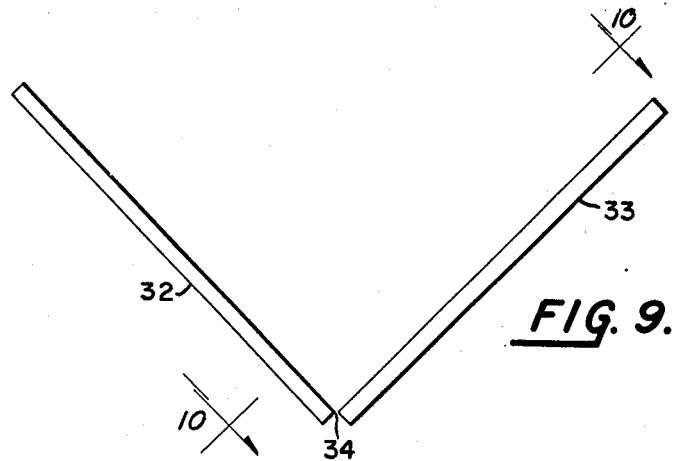
FIG. 9 is an end view, on an enlarged scale, of a dual mirror shown in FIG. 7.
Figure 10:
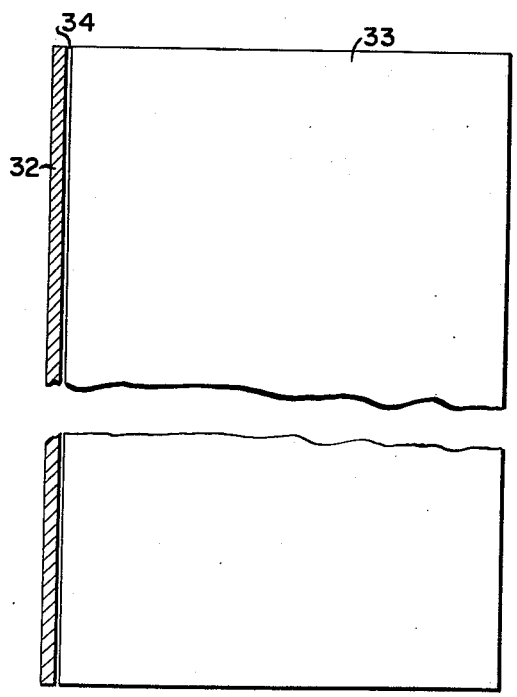
FIG. 10 is a condensed cross section, taken along line 10—10 of FIG. 9.

The preferred projection system of this invention is particularly adapted to be used in conjunction with the illumination system previously described and may be constructed as illustrated in FIG. 7. As shown in FIG. 7, the image produced by illumination of the microrecord 12 may be enlarged by the projection lens 17 and reflected by a plane mirror 30, which is disposed directly beneath the projection lens 17 and inclined at a suitable angle, such as 52.5° to the horizontal, so that an image pattern within the elliptical area 31 of FIG. 8 will be reflected by mirror 30 onto a dual right angle or "roof" mirror having a left half 32 and a right half 33, disposed 90° apart, as in FIG. 9, with a gap 34 therebetween. From mirrors 32 and 33, the image is reflected onto a plane mirror 35, conveniently disposed in the rear portion of, or forming the rear wall of, the auxiliary housing 13 of FIG. 1, while from the plane mirror 35, the image is reflected onto a translucent screen S. The image projected through the projection lens 17 onto the mirror 30, then onto the two mirrors 32 and 33, then onto the back mirror 35 and the screen S, follows the optical axes indicated by dot dash lines 36, 37, 38 and 39. It will be noted that mirrors 30 and 35 each reverse the image, thus compensating for each other in the event that the microrecord contains printing or the like which is to be read when projected on the screen. As will be evident, if a single plane mirror were placed in the position of dual mirrors 32 and 33, this plane mirror would again reverse the image, so that the image appearing on the screen would then be reversed from the image of the microrecord. However, by using two mirrors 32 and 33, disposed at right angles to each other, a double reversal of the image takes place, i.e., not only from top to bottom, as it were, for each of mirrors 32 and 33, but also from left to right and vice versa. Thus, that portion of the image reflected by mirror 32 will appear in reverse on the opposite side of mirror 35 while that portion of the image reflected by mirror 33 will also appear in reverse on the opposite side of mirror 35, the effect thus being to produce an image on the screen S which corresponds to that of the microrecord. It will be noted, of course, that the final position of the image on screen S, with respect to whether it is upside down or right side up, will be determined by proper placement of the respective edge of the microrecord 12 over the window 11, so that portion of the microrecord corresponding to the lower edge of the final image will follow the dotted projection lines 40, 41, 42 and 43, while that edge of the microrecord corresponding to the upper edge of the final image will follow the dotted projection lines 44, 45, 46 and 47. An advantage of this projection system is that screen S, as in FIG. 7, may be disposed at an acute angle to the vertical, so that it is readily observed by the user of the projector. As will be evident from a comparison of FIGS. 2, 3 and 4 with FIG. 7, the illumination system of FIGS. 2, 3 and 4 provides adequate clearance for placement of the parts of the projection system of FIG. 7. Also, the dual mirror 32, 33 may be positioned with sufficient accuracy, since the gap 34 can vary in width, such as up to 0.75 mm. wide, and the tolerance of the angle between mirrors 32 and 33, which is preferably 90°, can vary therefrom, such as ±9 seconds of arc, for the illustrative projection system described below. It will be noted that, if the dual mirror were placed in the position of back mirror 35, the tolerance for gap 34 would become too small for practical purposes, while if the dual mirror were placed in the position of lens mirror 30, the tolerance for the angle between mirrors 32 and 33 would become too small for practical purposes.

In such an illustrative projection system, used in conjunction with the illumination system previously described, the screen S is 16 by 15 inches and inclined 15° from the vertical while the projection lens 17 is a Zeiss Sonnar F/2 lens having a focal length of 85 mm. The plane mirror 30 is spaced 195 mm. along the optical axis 36 from window 11 and inclined so that the optical axis 37 is 15° from the horizontal. Each of mirrors 32 and 33 is inclined so that a lateral line thereon will be at 45° to the horizontal and inclined upwardly at an angle such that the optical axis 38 will be 15° from the vertical, and positioned so that the distance along optical axis 37 will be 330 mm. The back mirror 35 is inclined so that optical axis 39 will be 15° from the horizontal and positioned so that the distance along optical axis 38 will be 500 mm. and the distance along optical axis 39 will be such that the optical center of screen S, at the point of intersection of optical axis 39, will be 270 mm. above and 180 mm. rearwardly of the center of window 11. It will be evident that the above projection system of this invention may also be used in other types of projectors, i.e., where an irregular light path is involved, as from a window in a housing, at which an article provided with an image to be reproduced is placed, to a screen at a position spaced from the window and in a plane disposed at an angle to the plane of the window. The article provided with an image to be reproduced may be opaque or transparent, while the light may be reflected from the article, as when opaque, or passed through the article, as when transparent.

Figure 11:
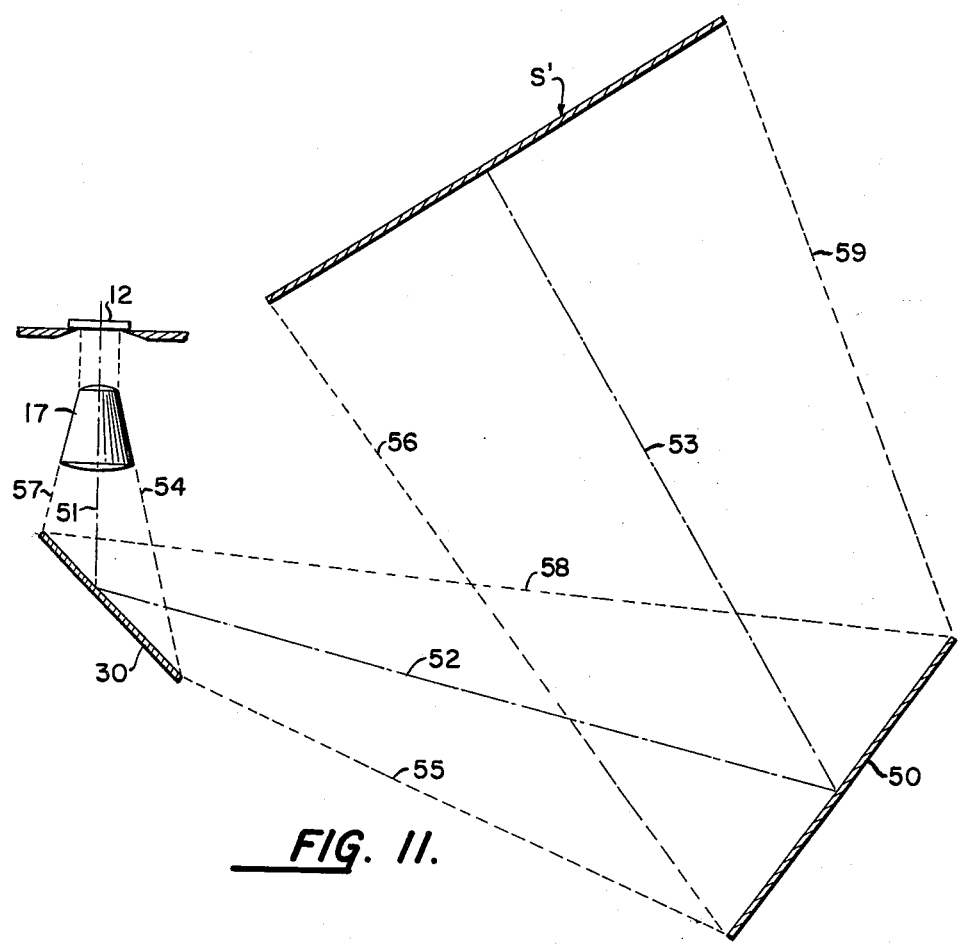
FIG. 11 is a vertical section similar to FIG. 7, but illustrating an alternative manner of projection.

Particularly when used in conjunction with the illumination system of this invention, a less desirable but simplified projection system may be utilized, as shown in FIG. 11, to project the image on a screen S', which is disposed at a considerably greater angle to the vertical than screen S of FIG. 7 and, in fact, at an acute angle, such as 30°, to the horizontal. Thus, screen S' is not as readily observed as screen S of FIG. 7, so that the projection system of FIG. 7 has definite advantages over that of FIG. 11. As shown in FIG. 11, the projection lens 17 may be placed directly beneath window 11, as before, while plane mirror 30 may be placed directly therebeneath and inclined at a suitable angle to the horizontal, such as 52.5°, as before. However, a single mirror 50 may be located in the lower portion of the housing and inclined at a suitable angle so that the image directed thereon from mirror 30 will be reflected onto screen S', the optical axes between lens 17, mirrors 30 and 50 and screen S' being along dot dash lines 51, 52 and 53. As will be evident, the reversal of the image by mirror 30 is compensated by the second reversal of the image by mirror 50. Also, the edges of the microrecord 12, corresponding to the lower and upper edges of the final image on screen S', should be appropriately placed, since the lower edge of the screen image will be projected along dotted lines 54, 55 and 56, while the upper edge of the screen image will be projected along dotted lines 57, 58 and 59. As will be evident, the position of the microrecord for the system of FIG. 11 is reversed with respect to the position in which the microrecord is placed relative to window 11 in the system illustrated in FIG. 7.

It will be noted that the projection system of FIG. 11 is, in general, a conventional one, whereas the projection system of FIG. 7 is novel and has numerous advantages thereover. For instance, the projection system of FIG. 7 and particularly the mirrors 32 and 33 disposed at right angles to each other, not only produce a complete image reversal, but also permit much greater freedom in the location of screen S, particularly the placement of the screen so that it may be nearly vertical. Also, it is much less expensive than the use of other stratagems to cause a reversal of the image, such as by the use of a single plane mirror instead of mirrors 32 and 33, but a roof prism substituted for mirror 30 to reverse the image. Also, the preferred position of mirrors 32 and 33 permits sufficient tolerance, for practical purposes, of the angles between mirrors 32 and 33, such as plus or minus 9 seconds apart with a maximum gap of 0.75 mm. between the adjacent edges of mirrors 32 and 33 for a projection screen about 16 in. by 15 in. in size and inclined 15° from the vertical, a window 11 one inch by one inch, and other dimensions, angles and distances of the various mirrors comparable thereto.

Figure 13:
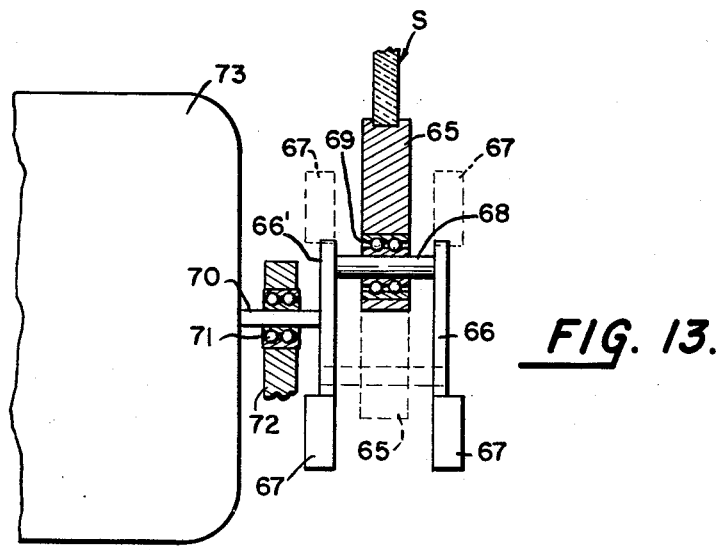
FIG. 13 is a fragmentary section, on an enlarged scale, taken along line 13—13 of FIG. 12.
Figure 12:
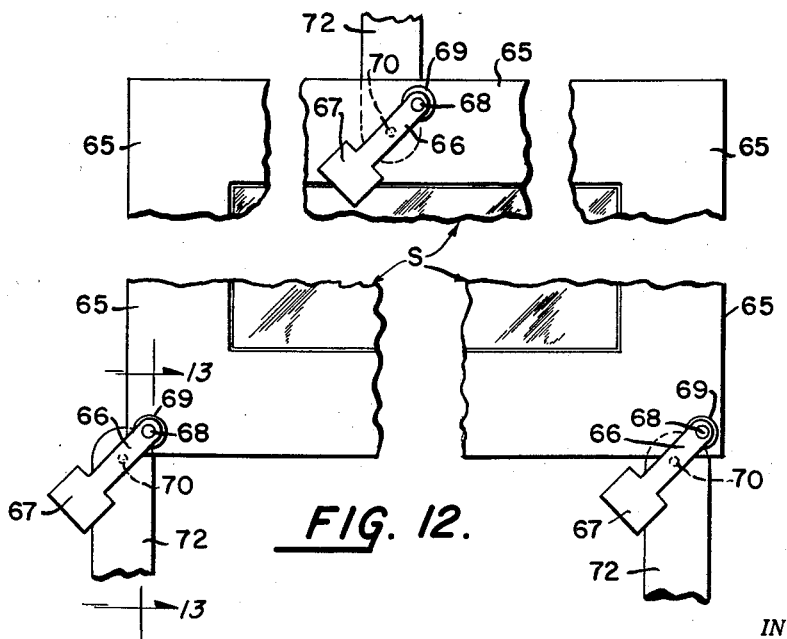
FIG. 12 is a condensed front view of the screen on which the microrecord is projected and illustrating particularly the manner in which the screen may be supported during use.

In order to eliminate the "flicker" resulting from the grain of the screen which causes eye fatigue for one viewing images on the screen for an extended period of time, as well as an adverse effect upon resolution, screen S is preferably moved bodily for a short distance, in a rotary movement. For this purpose, as illustrated in FIG. 12, the screen S may be mounted in a rectangular frame 65 and the screen supported at three points or more, such as two points on the lower corners and one point at the center of the upper edge, as by arms 66 provided with counterweights 67 and each movable around a circular path. As in FIG. 13, each arm 66 and its counterweight 67 may be disposed forwardly of frame 65 and a companion arm 66', with its counterweight 67, disposed rearwardly of frame 65, the inner ends of each pair of arms 66 and 66' being connected together by a shaft 68 which is pivotally connected to frame 65, as by a ball bearing 69. A pin 70 may be connected to inner arm 66' and rotatable in a bearing, such as a ball bearing 71, mounted in a support 72 which may be disposed within the auxiliary housing 13 of FIG. 1 and may conform generally in shape to the periphery of screen S and frame 65, or may be formed merely by supports provided within the auxiliary housing. One pin 70, as in FIG. 11, may be connected to the drive shaft of an electric motor 73, while pin 70 for each of the other arms 66' may be similar to pin 70 but not connected to a motor. The motor 73 may, of course, be disposed within the auxiliary housing 13, rearwardly of screen S. As will be evident, when arms 66 and 66' move around, frame 65 and each counterweight 67 will move between the respective full and dotted positions of FIG. 13. The auxiliary housing 13, as in FIG. 1, may be provided with a stationary rectangular frame 75 behind which frame 65 and arms 66 move, so that the observer sees only screen S within the stationary frame 75.

The amplitude of the movement need not be great, such as about a ⅜ inch radius for a screen about 15 in. by 16 in. in size, while the speed or rotation need not be great, such as approximately 10 revolutions per minute. A particular advantage of the rotary movement of the screen is that there is an absence of vibration produced by the motion, as in reciprocatory movement, while the advantages of the use of the three cranks include the absence of friction sufficient to produce vibration and the absence of any dead center to cause difficulty due to stoppage on dead center. The rotary movement mechanism for the screen may be made with accuracy and precision, since the holes in arms 66 and 66' for pins 68 may be drilled simultaneously in three pairs of arms in stacked relation, while the holes for pins 70 in arms 66' may also be drilled simultaneously in three arms in stacked relation. Thus, the radius of rotation of the three pairs of arms may be made equal with precision.

From the foregoing, it will be evident that the projector, illumination system and projection system of this invention fulfill to a marked degree the requirements and objects hereinbefore set forth. By the use of two plane mirrors, between a lamp having associated therewith a concave elliptical mirror and the window for which illumination is to be provided, a greater efficiency of illumination can be secured. The lamp can be placed in a vertical position, so that the filaments thereof do not tend to sag while heated and a substantially maximum amount of illumination may be provided at the window. The image of the lamp filaments may be focused in the plane of the window, rather than beyond, thus increasing the amount of illumination and equalizing the illumination over the general area of the window. Also, full advantage may be taken of a four filament lamp, which is preferably provided with a square envelope, with the filaments disposed in a square arrangement and at 45° with respect to the sides of the envelope. Such illumination may also be secured without interfering with the projection of the image from the illuminated microrecord. Such an illumination system is compatible with a more conventional projection system, in which two mirrors are used to project the image onto a screen, which screen, however, cannot be placed at more than an acute angle to the horizontal. However, with the preferred projection system of this invention, the screen may be placed in a more nearly vertical position. By the use of three mirrors, the central one of which consists of a dual mirror, formed by two mirrors disposed at right angles to each other, the normal reversal of the image by a single mirror may be compensated for. The rotary movement of the screen by counterweighted arms also tends to overcome the "flicker" produced by the grain of the screen and does not tend to produce vibration. Also, the mechanism for producing rotary movement may be made with a high degree of precision.

Although certain specific embodiments of this invention have been illustrated and described, it will be understood that other embodiments may exist and that various changes may be made therein, all without departing from the spirit and scope of this invention.

What is claimed is:

1. An illumination system for microrecords wherein a projection lens is disposed beneath a window over which the microrecord is placed, comprising a lamp having a base, a transparent envelope extending longitudinally from said base and a series of longitudinally extending filaments within said envelope; means for supporting said lamp base with said filaments in vertical position and spaced laterally from said projection lens; a concave reflecting mirror disposed in upright position adjacent a side of said lamp opposite said projection lens and angularly with respect to a vertical plane passing through the centers of said lamp and projection lens; a first plane mirror disposed on the opposite side of said lamp from said concave mirror and angularly with respect to both the vertical and horizontal, said first plane mirror being positioned to be within the light envelope reflected from said concave mirror and laterally from said projection lens; and a second plane mirror disposed in upright position, at a generally higher elevation than said first plane mirror, adjacent but spaced laterally from said projection lens and angularly with respect to said vertical plane, said second plane mirror being within the light envelope reflected from said first plane mirror and said window being within the light envelope reflected from said second plane mirror which passes between said projection lens and said window.

2. An illumination system as defined in claim 1, wherein the edges of said first and second plane mirrors adjacent each other are curved.

3. An illumination system as defined in claim 2, wherein said first and second plane mirrors are elliptical in shape.

4. An illumination system as defined in claim 1, wherein said mirrors are so situated that the image of said lamp filament is focused in said window and disposed across one dimension thereof.

5. An illumination system as defined in claim 1, wherein said lamp is provided with a series of four filaments, two of said filaments being disposed on one side and the other two of said filaments being disposed on the opposite side of the optical axis between said concave mirror and said first plane mirror.

6. An illumination system as defined in claim 1, wherein said lamp is provided with an envelope having four sides disposed in a square.

7. An illumination system as defined in claim 1, including a second lamp similar to said first-named lamp in construction and position, but opposite said first-named lamp with respect to said window; and a concave mirror, first plane mirror and second plane mirror associated with said second lamp and located relative to said second lamp, said window and said projection lens, in the same manner as said concave mirror and first and second plane mirrors associated with said first lamp.

8. A projector for microrecords, comprising a housing having a top, sides and a bottom, said top being provided with a window over which a microrecord may be placed; a screen mounted on the top of said housing and displaced from said window; a projection system including a projection lens within said housing and disposed beneath said window; a lens mirror consisting of a plane mirror disposed beneath said projection lens and within said housing for reflecting the image of said microrecord; a lamp having a base, a transparent envelope extending longitudinally from said base and a series of longitudinally extending filaments within said envelope; means for supporting said lamp base on said bottom with said filaments in vertical position and spaced laterally from said projection lens within said housing; a concave reflecting mirror disposed within said housing in upright position adjacent a side of said lamp opposite said projection lens and angularly with respect to a vertical plane passing through the centers of said lamp and projection lens; a first plane mirror within said housing disposed on the opposite side of said lamp from said concave mirror and angularly with respect to both the vertical and horizontal, said first plane mirror being positioned to be within the light envelope reflected from said concave mirror and laterally from said projection lens; and a second plane mirror within said housing and disposed in upright position at a generally higher elevation than said first plane mirror, adjacent but spaced laterally from said projection lens and angularly with respect to said vertical plane, said second plane mirror being within the light envelope reflected from said first plane mirror and said window being within the light envelope reflected from said second plane mirror which passes between said projection lens and said window.

9. A projector for microrecords as defined in claim 8, wherein said screen is disposed at an acute angle to the vertical; and said projection system includes a dual mirror consisting of a pair of plane mirrors disposed at right angles to each other and rearwardly of said lens mirror; and a back mirror consisting of a plane mirror disposed rearwardly of said screen and above said dual mirror.

10. A projector for microrecords, as defined in claim 8, wherein said screen is disposed at an acute angle to the horizontal; and said projection system includes a plane mirror disposed rearwardly of said lens mirror and generally beneath said screen.

11. A projector for microrecords, as defined in claim 8, including means for rotating said screen bodily about a circular path.

12. A projector for microrecords as defined in claim 11, wherein said means for rotating said screen comprises a series of at least three cranks pivotally connected to said screen at spaced positions; a support for each of said cranks; means pivotally mounting each crank on the corresponding support; and means for rotating one of said cranks.

References Cited in the file of this patent
UNITED STATES PATENTS

| | | |
|---|---|---|
| 1,153,685 | Guerzoni et al. | Sept. 14, 1915 |
| 2,079,621 | Land | May 11, 1937 |
| 2,186,123 | Rantsch et al. | June 9, 1940 |
| 2,348,818 | Jacobson | May 16, 1944 |
| 2,505,505 | Sachtleben | Apr. 25, 1950 |
| 2,525,596 | Finn | Oct. 10, 1950 |
| 2,588,373 | Erban | Mar. 11, 1952 |
| 2,688,271 | Gretener | Sept. 7, 1954 |
| 2,711,699 | Erban | June 28, 1955 |
| 2,746,344 | Pratt et al. | May 22, 1956 |
| 2,804,800 | Stevens | Sept. 3, 1957 |
| 2,843,009 | Stevens | July 15, 1958 |
| 2,847,901 | Sassaman et al. | Aug. 19, 1958 |

FOREIGN PATENTS

| | | |
|---|---|---|
| 502,160 | Great Britain | June 5, 1937 |